US006826357B2

(12) United States Patent
Tommaso

(10) Patent No.: US 6,826,357 B2
(45) Date of Patent: Nov. 30, 2004

(54) ELECTRIC WATER HEATER WITH WHIRLING DEVICE

(75) Inventor: Helio Tommaso, São Paulo (BR)

(73) Assignee: Duchacorona LTDA (BR)

( * ) Notice: Subject to any disclaimer, the term of this patent is extended or adjusted under 35 U.S.C. 154(b) by 0 days.

(21) Appl. No.: 10/685,268

(22) Filed: Oct. 13, 2003

(65) Prior Publication Data

US 2004/0096203 A1 May 20, 2004

(30) Foreign Application Priority Data

Nov. 19, 2002 (BR) ........................................ 8202703 U

(51) Int. Cl.[7] ................................................ A47J 31/00
(52) U.S. Cl. ............................... 392/465; 4/598; 4/601
(58) Field of Search ................................ 392/441, 449, 392/465, 471, 474; 4/596, 598, 601

(56) References Cited

U.S. PATENT DOCUMENTS 4,098,461 A * 7/1978 Weller ........................ 239/381
5,093,943 A * 3/1992 Wei ............................... 4/615
5,704,547 A * 1/1998 Golan et al. .................. 239/11
6,081,945 A * 7/2000 Keene et al. .................. 4/615

* cited by examiner

*Primary Examiner*—Thor Campbell
(74) *Attorney, Agent, or Firm*—Brooks Kushman P.C.

(57) ABSTRACT

The present invention refers to an electric water heater providing high efficiency and safety to users, increasing time intervals as required for maintenance and consequently considerably increasing its working life.

The electric water heater (1) of the present invention is formed by a higher cap (2) and a sprayer element (3), being internally provided with a monobloc (10) to accommodate mechanical and electrical devices for the operation of the heater. Said sprayer element (3) is provided with whirling elements (6) attached inside ring bodies (7) and incorporated to the water outlet holes (5).

17 Claims, 5 Drawing Sheets

ELECTRIC WATER HEATER WITH WHIRLING DEVICE

FIELD OF THE INVENTION

The present invention refers to a new constructive embodiment applied for electric water heaters, provide with features that increasing their efficiency and working life, besides providing uniform water flow, even when used in regions where water contains high matter rate of material in suspension.

BACKGROUND OF THE INVENTION

Numerous models of electric water heaters, such as showers and like, are currently known and used, being commonly found in bathrooms and dressing rooms, since they are easy to install, use and maintain, and for their very good cost-benefit ratio in comparison with other types of water heaters, such as gas heaters.

These showers and like are provided with sprayer element, generally cap-like parts provided with a plurality of holes. However, said sprayers showing a few inconveniences for users when water quality is not within the best standards as established by the general rules regulating the issue, since it is generally known by the population that, although there are numerous water treatment systems, there is no system able to eliminate small debris and solid dirt remaining in the treated water. This is the case of waters which, despite being recommended for bath, present high rate matter of solid suspended material, such as very small grains of lands, sand and stone, among others.

It is also known that, in water treatment systems, many chemicals are added to dirty waters to clean them and said products frequently create small flocks or debris which can also block the sprayer element of the showers, making the water flow to be changed or even interrupted. Therefore, as the time passes, it is very common that many holes are blocked, thus causing inappropriate operation of the shower and discomfort to the users.

Also, these inconveniences cause premature maintenance of water heater devices, since the user needs to open the device within given time periods, take out and clean the sprayer element, in an attempt to recover the original flow of water. However, in many cases it is difficult to obtain a water flow identical to the originally manufactured heater, since small orifices are definitively damaged by debris and by the water flow pressure coming from the hydraulic system. As a consequence, the working life of said water heaters is reduced.

BRIEF DESCRIPTION OF THE INVENTION

Therefore, with the purpose to resolve the above mentioned inconveniences, a new constructive embodiment for electric water heaters, such as showers and similar, was developed, providing more uniform water jet and reaching a relatively higher bath area in comparison with the heaters of the prior art.

More specifically, it is an object of the present invention to supply a heater provided with a sprayer element that has whirling devices, which is able to supply a water flow to provide users a comfortable shower bath and allowing to reduce or even eliminate the periodical maintenances to clean said sprayer element.

Another object of the invention is to provide a electric water heater having reduced quantity of water outlet holes over similar ones, allowing them to have larger diameter, which avoids blocking inconveniences caused by waters of quality out of standards as established by rules, or even damage of water outlet holes, causing as a result an increase in the working life of the heater device, thus avoiding undesirable maintenance and its full damage.

With that purpose, the water heater object of the present invention is formed by two external caps, with the lower cap forming the sprayer element, provided with a small number of larger diameter holes than conventional ones, each one provided with a whirling device providing, as a whole, uniform and constant water flow in a larger and comfortable radius of action.

BRIEF DESCRIPTION OF THE DRAWINGS

The attached figures show the object of the present invention, in which.

DETAILED DESCRIPTION OF THE INVENTION

Figure 1:
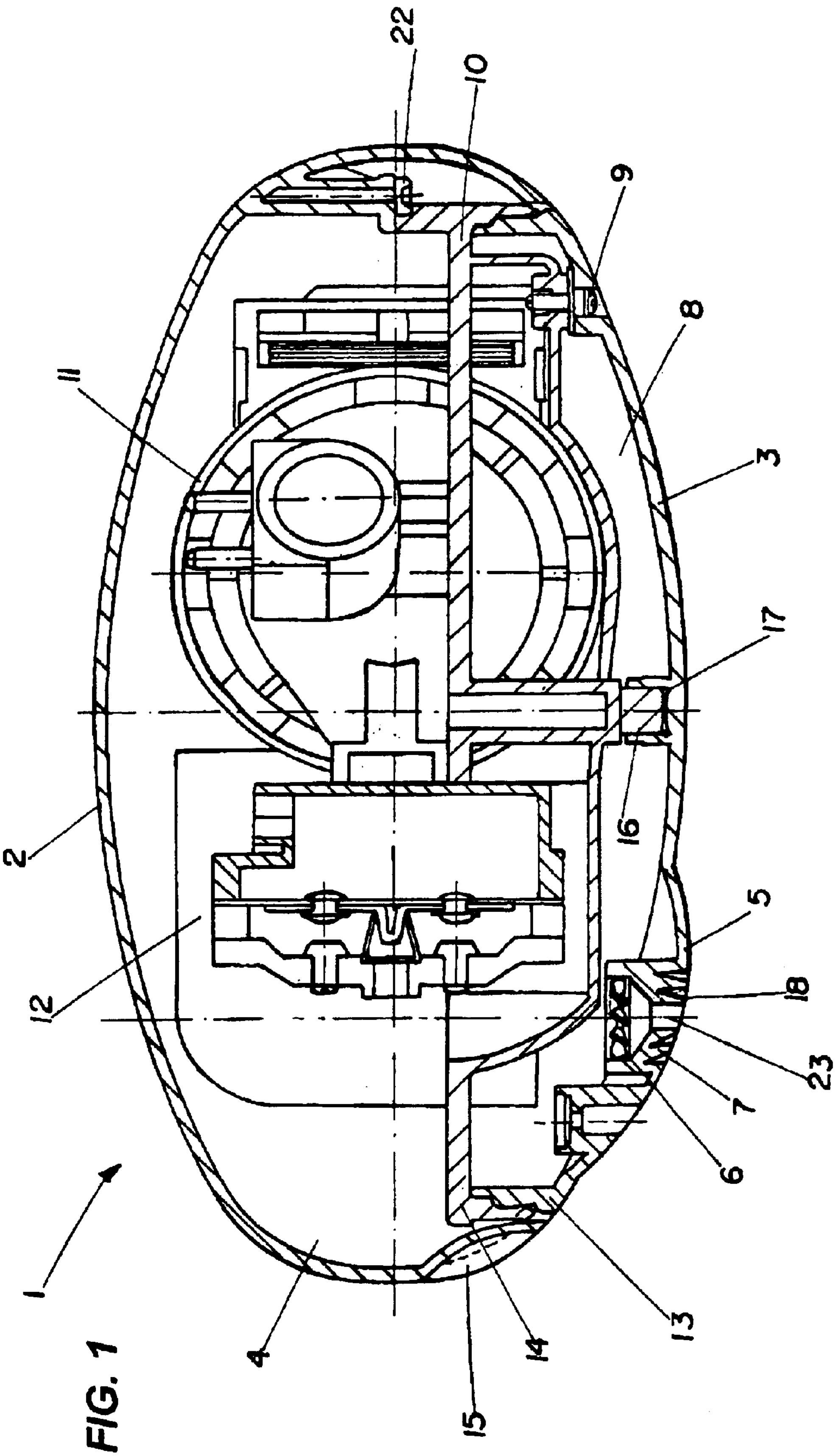
FIG. 1 shows a longitudinal sectional view of the water heater as the object of the invention.

According to the above mentioned figures, we can see that the electric water heater of the present invention comprises a cylindrical body (1) formed by two spherical caps, a higher one (2) and a lower one (3), one attached to the other by means of fastening screws (9), forming a enclosure (4) to receive electrical and mechanical devices to heat the water. Said lower cap (3) should be interpreted here within as having the same meaning of sprayer element.

Therefore, the sprayer element (3) comprises water outlet holes (5) provided with whirling elements (6) located in a ring body (7). In the internal part of the sprayer element (3), when assembled within the electric water heater (1), it forms a water outlet chamber (8) so to guide the water uniformly to all holes (5), i. e. providing the same flow of water to all holes (5).

The internal part of said electric water heater (1) also comprises a monobloc (10) attached to the higher cap (2) by means of screws (22), and all operation parts of the device are horizontally located in said monobloc (10), such as heating chamber (11), operation chamber (12), electrical contact clamps (not shown), pressurizing pump (not shown), etc.

Figure 5:
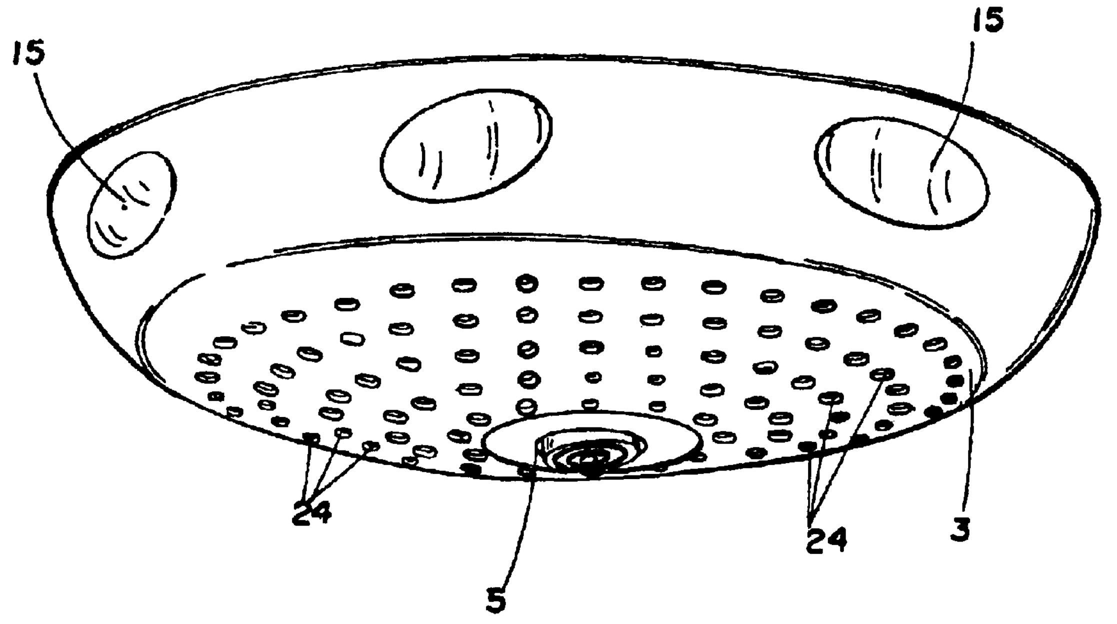
FIG. 5 shows a perspective view of the lower part of an alternative embodiment of the sprayer element of the water heater shown in FIG. 1.

Said holes (5) are uniformly located on said sprayer element (3), and the quantity of holes is considerably lower than the sprayer element known in the prior art, as we can observe in the attached figures. The quantity of holes (5) may vary according to the model of electric water heater, and may be from one single hole (5) up to eight holes, according to the technical features of the heater. It is also possible to make a combination between different kinds of water jets, such as shown in FIG. 5, disclosing a conventional sprayer element provided with various small diameter holes (24) and one single hole (5) located at the center of the sprayer element surface (3), so to increase the flow of water and the bath comfort for the users.

The lower portion of said ring body (7) comprises various concentric rings (18) with diameters being reduced towards its center, which is provided with an outlet hole (23) for water. Therefore, the flow of water, when passing through the whirling element (6), is guided towards the hole (23), causing whirl of the water, which is expelled from the shower under high pressure and uniformly, providing comfortable shower bath to users.

The sprayer element (3) also comprises an internal ring wall (13), screwed in a lower protuberance (14) of the monobloc (10) to be hermetically attached therein and form said water outlet chamber (8). To help to attach and remove said sprayer element (3), there are recesses (15) located in the periphery of said sprayer element (3) for users, technicians and assemblers to be able to safely accommodate hand fingers to open or close the electric water heater. Furthermore, a locator pin (16) located at the lower part of said monobloc (10) is fitted with a central hole (17) located at the internal part of the sprayer element (3) to align it in the monobloc (10), thus appropriately closing the electric water heater (1). Furthermore, screws (9) are fixed between the sprayer element (3) and the monobloc (10) to assure working safety of the heater.

Figure 2:
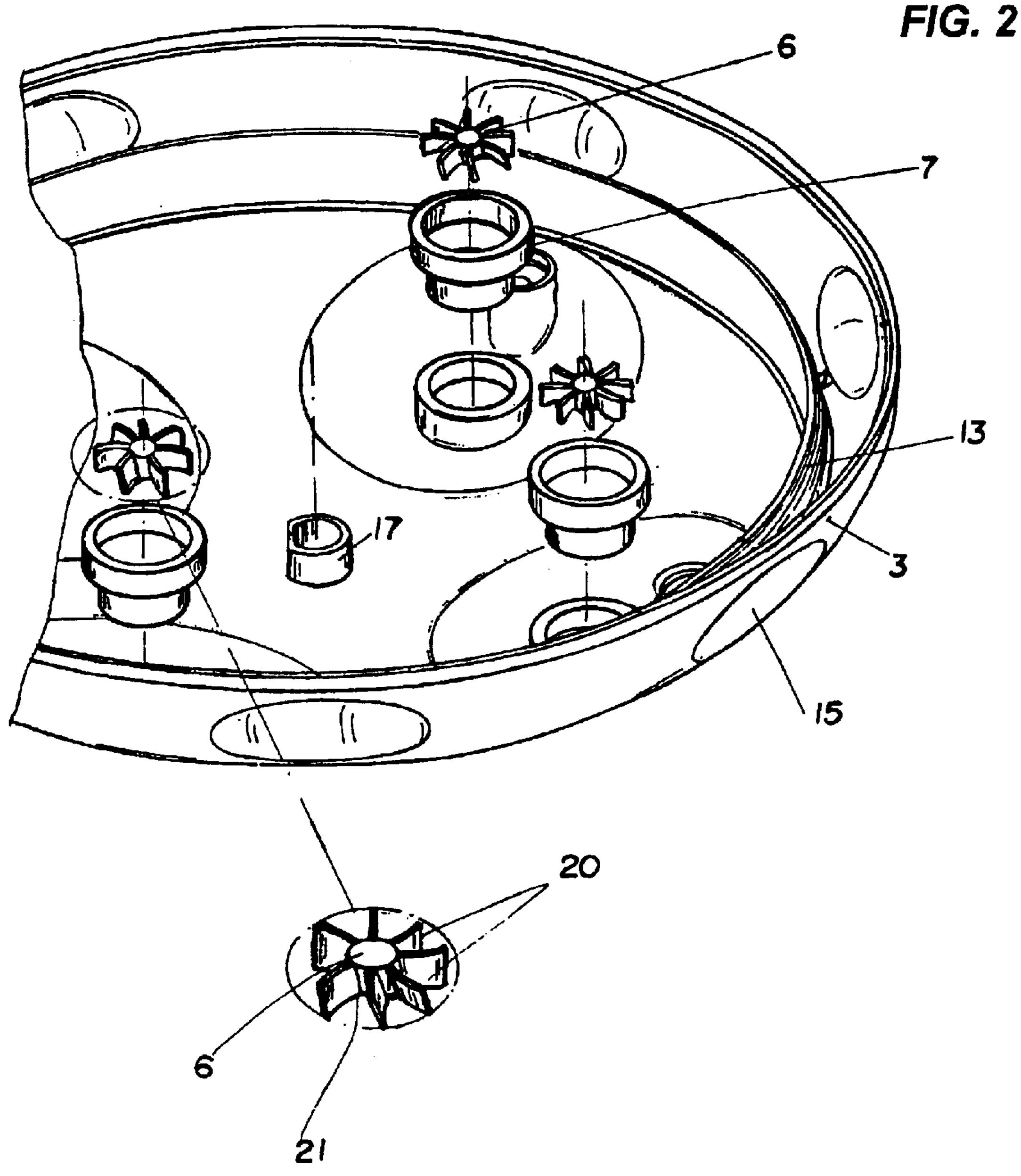
FIG. 2 shows a perspective view of the internal part of the sprayer element of the water heater shown in FIG. 1, with the whirling devices disassembled.

With reference to FIG. 2, in which the sprayer element is shown isolated, a preferred embodiment of the present invention is shown, by using four water outlet holes (5). In this figure, the ring body (7) and the whirling element (6) of each hole are shown, both disassembled. Furthermore, in the enlarged detail shown in that same figure, it can be seen that the whirling element (6) has the shape of a wheel with inclined blades (20) forming small water outlet channels (21) to cause whirl of the water flux and allow the flow from the water outlet chamber (8) to the environment.

Figure 3:
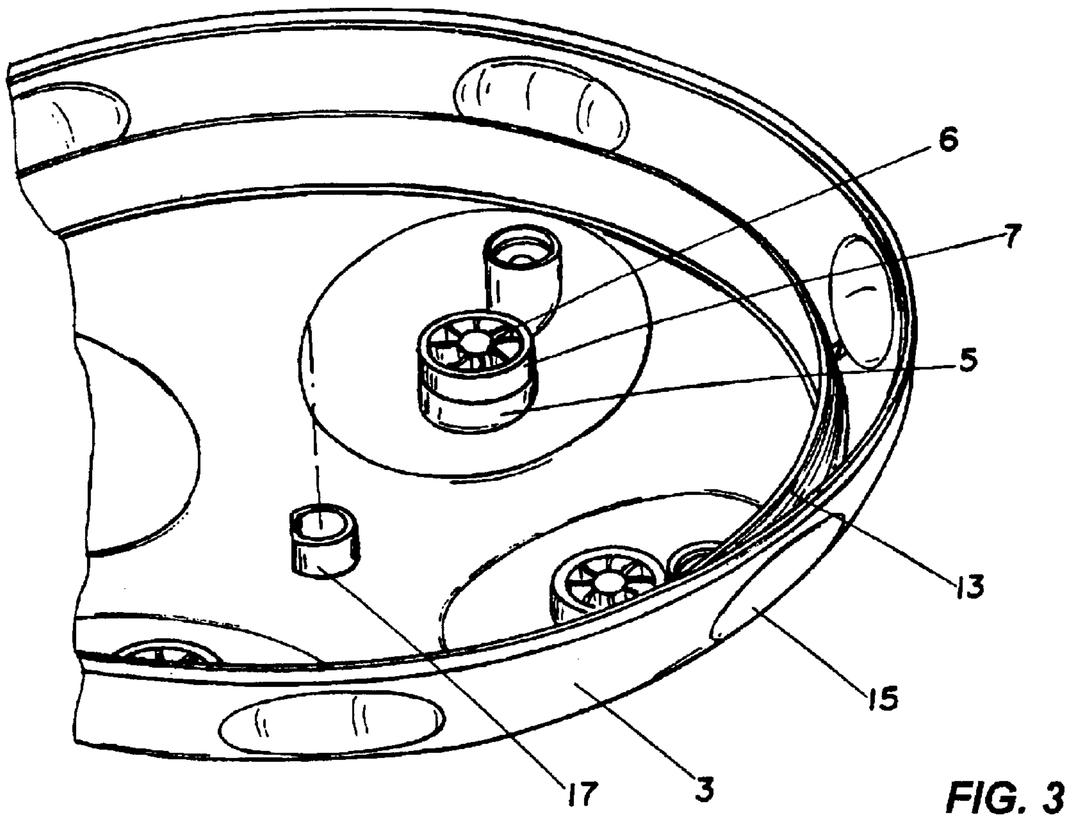
FIG. 3 shows a perspective view of the internal part of the sprayer element of the water heater shown in FIG. 1, with the whirling devices assembled.

Referring to FIG. 3, the internal part of the sprayer element (3) is shown with whirling elements (6) fitted in the respective ring bodies (7) which, on the other hand, are attached inside the outlet holes (5). In this Figure, we can verify the assembled sprayer element (3) ready to be screwed in the monobloc (10) through ring walls (13) and (14), which are provided with screws for that end.

Figure 4:
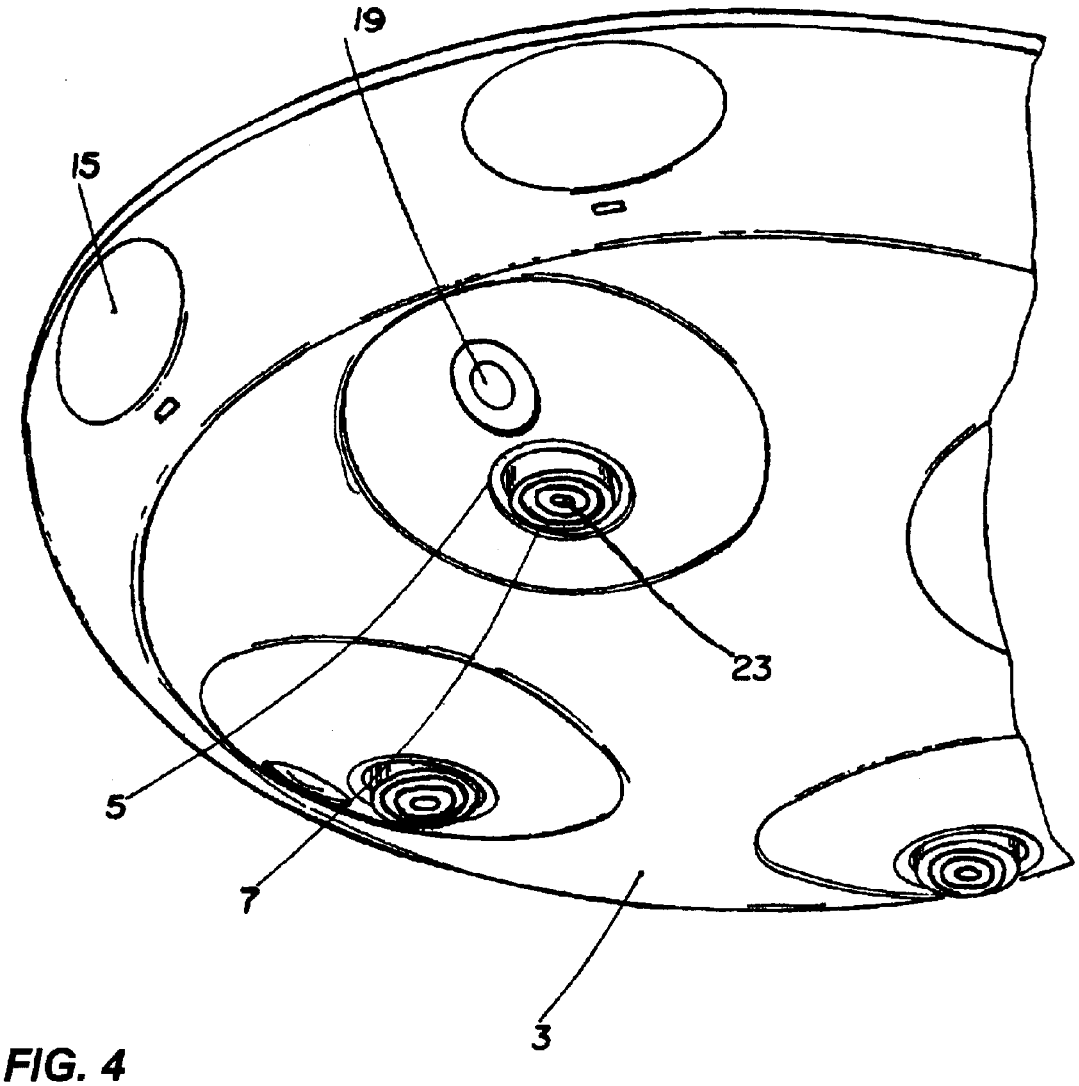
FIG. 4 shows a perspective view of the lower part of the sprayer element of the water heater shown in FIG. 1.

Referring to FIG. 4, which shows a view of the lower part of said sprayer element (3), we can verify that the ring bodies (7) are partially projected outside the external surface of the sprayer element (3) to grant the scheduled inclination to the direction of the water jet, compressing water and providing higher flow to the heater. Holes (19) located adjacent to each water outlet are provided to receive fastening screws (9) to close the electric water heater (1) safely and efficiently, avoiding any risk of de-coupling or even any damage to the waterproofing of the water outlet chamber (8).

From all the above explained, we can see that the electric water heater object of the present invention presents a new constructive embodiment disclosing many effects and advantages when compared to the prior art.

What is claimed is:

1. An electric water heater with whirling device, having a cylindrical body formed by a higher cap and a lower cap, wherein the lower cap comprises a sprayer element having water outlet holes uniformly spaced on said sprayer element and whirling elements attached to ring bodies incorporated in said water outlet holes partially projecting out from an external surface of said sprayer element.

2. The electric water heater with whirling device of claim 1, wherein the lower portion of the water outlet comprises a plurality of rings each having a central hole provided therethrough.

3. The electric water heater with whirling device of claim 1, wherein said sprayer element includes a plurality of small-diameter holes and at least one water outlet hole located at the center of the surface of said sprayer element.

4. The electric water heater with whirling device of claim 1, wherein the quantity of water outlet holes varies between 1 and 8 outlet holes.

5. The electric water heater with whirling device of claim 1, further comprising a monobloc located inside an enclosure, between said higher cap and said sprayer element, wherein the monobloc horizontally accommodates a heating chamber operation chamber, pressurizing pump and electrical devices for water heating.

6. The electric water heater with whirling device of claim 5, wherein said monobloc also comprises a locating pin located in its lower portion, which is fitted in a central hole located on the internal surface of said sprayer element.

7. The electric water heater with whirling device of claim 5, wherein said sprayer element is provided with an internal ring wall provided with a screw, which is attached to a lower ring wall of said monobloc, to hermetically close a water outlet chamber.

8. The electric water heater with whirling device of claim 7, wherein the attachment of said sprayer element to said monobloc is made by means of screws located in holes adjacent to the water outlet holes.

9. The electric water heater with whirling device of claim 8, wherein the attachment of the sprayer element to said monobloc is made by means of pressure fittings or any other equivalent means.

10. An electric water heater with whirling device having a cylindrical body formed by a higher cap, a lower cap including a sprayer element having water outlet holes uniformly spaced on said sprayer element and whirling elements attached to ring bodies incorporated in said water outlet holes partially projecting out from an external surface of said sprayer element and a monobloc located inside an enclosure between said higher cap and said sprayer element, wherein the monobloc horizontally accommodates a heating chamber, operation chamber, pressurizing pump and electrical devices for water heating.

11. The electric water heater with whirling device of claim 10, wherein the lower portion of the water outlet comprises a plurality of rings each having a central hole provided therethrough.

12. The electric water heater with whirling device of claim 10, wherein said sprayer element includes a plurality of small-diameter holes and at least one water outlet hole located at the center of the surface of said sprayer element.

13. The electric water heater with whirling device of claim 10, wherein the quantity of water outlet holes varies between 1 and 8 outlet holes.

14. The electric water heater with whirling device of claim 10, wherein said monobloc also comprises a locating pin located in its lower portion, which is fitted in a central hole located on the internal surface of said sprayer element.

15. An electric water heater with whirling device having a cylindrical body formed by a higher cap, a lower cap including a sprayer element having water outlet holes uniformly spaced on said sprayer element and whirling elements attached to ring bodies incorporated in said water outlet holes partially projecting out from an external surface of said sprayer element and a monobloc located inside an enclosure between said higher cap and said sprayer element, wherein the monobloc horizontally accommodates a heating chamber, operation chamber, pressurizing pump and electrical devices for water heating, wherein said sprayer element is provided with an internal ring wall provided with a screw which is attached to a lower ring wall of said monobloc to hermetically close a water outlet chamber.

16. The electric water heater with whirling device of claim 15, wherein the attachment of said sprayer element to said monobloc is made by means of screws located in holes adjacent to the water outlet holes.

17. The electric water heater with whirling device of claim 16, wherein the attachment of the sprayer element to said monobloc is made by means of pressure fittings or any other equivalent means.

* * * * *